R. HAZELRIGG.
INSECT TRAP.
APPLICATION FILED FEB. 6, 1909.
980,253. Patented Jan. 3, 1911.
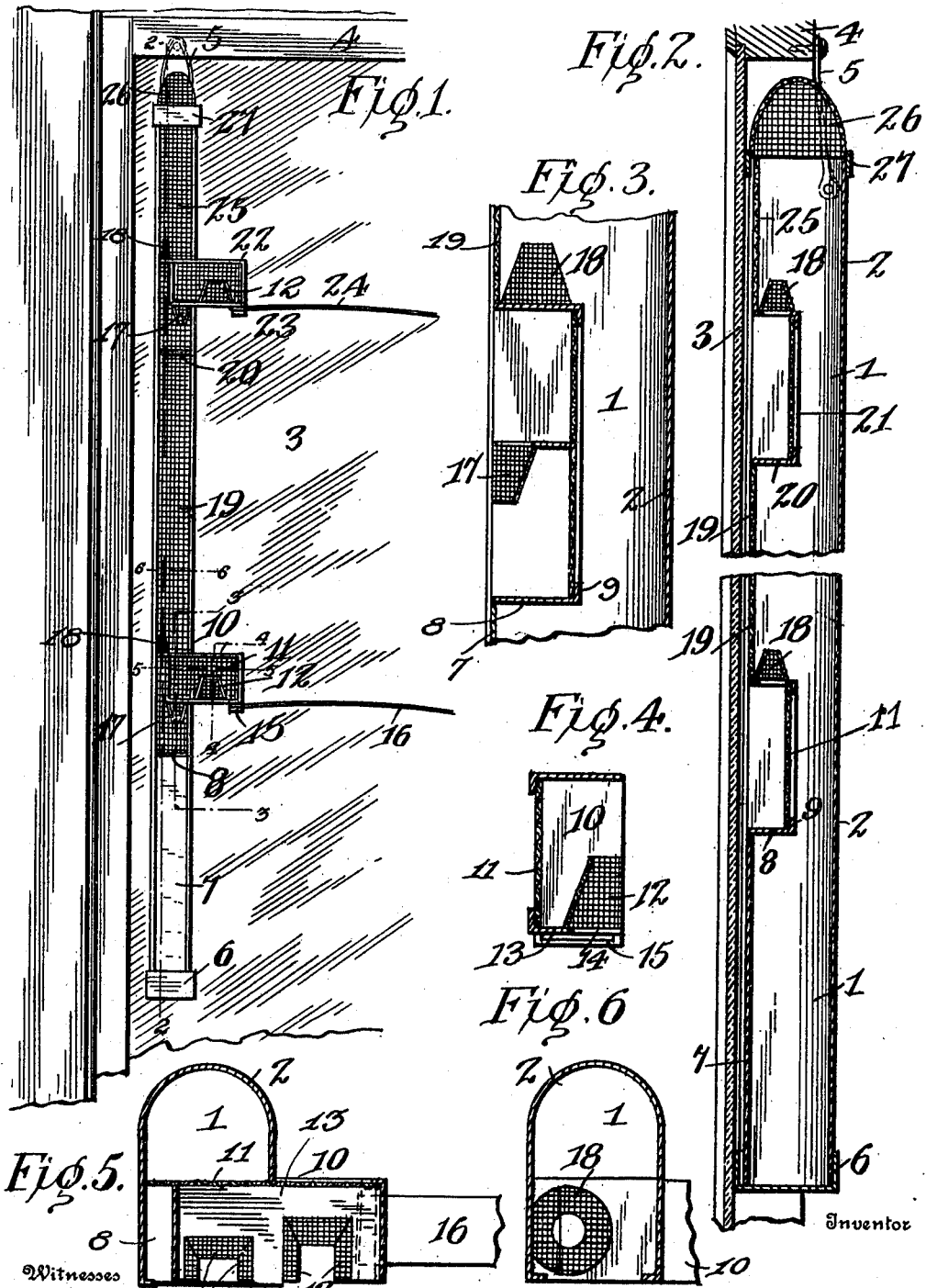
Witnesses
E. L. Miller
Jno. L. McCathran
Inventor
Ross Hazelrigg,
By E. E. Vrooman
his Attorney

UNITED STATES PATENT OFFICE.

ROSS HAZELRIGG, OF OAKLAND, CALIFORNIA, ASSIGNOR TO FLY-INN-TRAP CO., A CORPORATION OF CALIFORNIA.

INSECT-TRAP.

980,253.  Specification of Letters Patent.  Patented Jan. 3, 1911.

Application filed February 6, 1909. Serial No. 476,468.

*To all whom it may concern:*

Be it known that I, Ross HAZELRIGG, citizen of the United States, residing at Oakland, in the county of Alameda and State of California, have invented certain new and useful Improvements in Insect-Traps, of which the following is a specification, reference being had therein to the accompanying drawing.

This invention relates to insect traps especially adapted to be used in a suspended position on a window so that the insects will be guided to the entrance to the trap and pass through a tortuous passage to the body of the same, the said tortuous passage being so arranged that the insects will be prevented from returning, and thereby assuring of the insects not being permitted to escape.

In carrying out the objects of the invention generally stated above it is contemplated employing an elongated body the ends of which are closed by means of end caps which may be removed to permit other similar bodies to be coupled to the main body, so that a trap may be increased in length to suit the length of a window, the body of each being provided with a plurality of outstanding entrances for the insects, said outstanding entrances being provided with guides for directing the insects to the entrances, and said trap being provided with a closed-bottom chamber in which the dead insects are received so that they will be kept concealed from the insects entering the trap.

The primary elements necessary in the practical application of the invention as stated above are necessarily susceptible of a wide modification as to details and structural arrangements, but for illustrative purposes one efficient example of the same has been shown in the accompanying drawings, wherein—

Figure 1 is a rear elevation of the improved insect trap as viewed from the outside of a window. Fig. 2 is a vertical sectional view taken on the line 2—2 of Fig. 1. Fig. 3 is an enlarged fragmentary vertical sectional view taken on the line 3—3, Fig. 1. Fig. 4 is a similar view taken on the line 4—4, Fig. 1. Fig. 5 is a transverse sectional view taken on the line 5—5, Fig. 1. Fig. 6 is a transverse sectional view taken on the line 6—6, Fig. 1.

Referring to said drawings by numerals, 1 designates the body of the trap which consists of an elongated sheet metal portion forming the front and sides, the front face of which is rounded as indicated at 2, and its rear face flat so that the same will lie close against a window pane 3 when the trap is suspended from the top bar 4 thereof by means of a wire bail or loop 5, or its equivalent. The lower end of the trap body is closed by means of a removable end cap 6, and the portion of said trap body for a suitable distance above the lower end is provided with a rear, flat plate 7 which provides a bottom chamber for the reception of dead insects so that they will be concealed from view of the insects about to enter the trap. The dead insects may be readily removed from said bottom chamber by removing the end cap from the bottom thereof. The said lower rear flat plate 7 at its upper end carries an inwardly extending horizontal plate 8 the inner end of which terminates about mid-way of the depth of the body of the trap and forms a support for the lower end of a screen frame 9, the upper portion of which is extended at right angles to the main body and projects outwardly therefrom to form an entrance housing 10 the rear of which is closed by the window pane, and the front of which is closed by means of a screen 11. The bottom of said housing adjacent to its outer edge carries an upwardly tapering passageway 12 which is formed of screening, soldered or otherwise suitably secured to the metallic bottom 13 of the housing and arranged to surround the entrance opening formed in said bottom 13 and designated by the numeral 14, as is shown more clearly in Fig. 4. The outer bottom edge of said bottom 13 carries a loop or socket 15 for detachably holding one end of a guiding arm 16 which projects a suitable distance across the window pane so as to be in the pathway of insects crawling up the window and deflect the same to the passageway 12.

The portion of the housing 10 within the body of the trap, carries a tapering pendent passageway 17 which surrounds an opening formed at the inner end of the bottom 13 so that the insects passing therethrough will fall upon the inwardly extending horizontal plate 8, and from the same they will crawl up the screen frame 9 and between the end of the housing 10 and said screen frame and pass through an upstanding conical passageway 18 carried by the upper end of said screen and surrounding an opening formed through the inner end of the top plate of the housing 10, and enter the main body, and be in position to have an unobstructed passage to the bottom chamber. The rear face of the said body above the housing 10 is closed by means of a screen 19, which terminates at its upper end at a horizontally arranged inwardly extending flat plate 20, which supports another screen frame 21 vertically arranged within the body, and at its upper end carrying a housing 22, said screen frame 21 and housing 22 being similar in all respects to the screen frame 9 and housing 10 previously described, said housing also carrying a loop or socket 23 for detachably holding a guiding arm 24, which is also similar in all respects to the guiding arm described in connection with the housing 10.

Above the housing 22 the rear of the body is closed by a screen 25, and said body at its extreme upper end is closed by means of an end cap 26, the body of which is formed of screening, and carries a metallic collar 27 which has a snug fit over the end of said body.

The trap as described in the foregoing is a complete one, but the same is made so that by the removal of the end caps other traps may be attached to the body so as to increase the length of the said body, as will be readily understood.

It will be understood that while in the foregoing description and the accompanying drawings, but two entrances have been shown as applied to the trap, the same may be supplied with additional ones if desired or necessary.

In use, the trap is preferably arranged on the window as shown in Fig. 1, with its supporting loop or bail in detachable engagement with the end of the top rail of the window so that the trap will hang to one side of the window, with its guiding arms projecting across the same. The flat rear face of the trap body permits the same to lie snugly against the window so that there is no chance of the insects getting between the trap and the window, and through the described manner of guiding the insects to the entrance to the body, and the arrangement of passageways to said body, it will be seen that there is no chance of the insects escaping once they have entered any of the passageways.

I claim as my invention:—

1. In an insect trap as herein set forth, an elongated trough-shaped receptacle having a closed receptacle in its lower end with an opening in its top, a main screen extending over the back face of the main receptacle and provided with openings at intervals, entrance housings projecting laterally from the side of the main receptacle and each projecting partly into one of said openings in the back face of the main receptacle, a vertical entrance passageway located in the bottom of the outer end of each housing, a depending passageway located in the bottom of the inner end of each housing on the inside of the main receptacle, an opening into one of said openings in the back face of the main receptacle, a vertical tapering passageway mounted on the top of the inner end of each housing, a shelf located at the bottom of each of said openings in the main screen, a second screen extending from the top and in front of each housing to the edge of the shelf below each housing, and a flat elongated strip projecting lengthwise from the outer end of each housing.

2. In an insect trap as herein set forth, an elongated trough-shaped receptacle having its front and sides of opaque material, entrance housings projecting laterally at intervals from the side of said main receptacle and projecting outwardly from said main receptacle and each having its back face open and a screen over its front face, a passageway between the end of each housing and the side of the main receptacle, an opening into the main receptacle at its upper end, a shelf located beneath the upper housing, a screen extending over the back face of the main receptacle to the top of the lower housing, a second screen extending from the top of and in front of each of said housings to the shelf below each housing, a passageway between the upper housing opening into the screened space behind said housing, and removable caps at the ends of the main receptacle.

3. An insect trap, comprising an elongated body provided with a rear flat face at its lower portion, a horizontally arranged flat plate carried by the top of said flat face and projecting into said body to form a lower chamber, a screen carried by the upper portion of the rear of said body, an entrance housing communicating with the screened portion of said body, and a screen frame pendent from each housing within said body and providing passageways to said lower chamber.

In testimony whereof I hereunto affix my signature in presence of two witnesses.

ROSS HAZELRIGG.

Witnesses:
F. P. SCHROEDER,
H. C. SCHROEDER.